United States Patent
Crucianelli (10) Patent No.: US 11,730,080 B2
(45) Date of Patent: Aug. 22, 2023

(54) DEVICE FOR DELIVERING SOLID PARTICLES ON DEMAND, INTENDED FOR AGRICULTURAL MACHINERY

(71) Applicant: TALLERES METALURGICOS CRUCIANELLI S.A., Armstrong (AR)

(72) Inventor: Gustavo Crucianelli, Armstrong (AR)

(73) Assignee: TALLERES METALURGICOS CRUCIANELLI S.A., Armstrong (AR)

( * ) Notice: Subject to any disclaimer, the term of this patent is extended or adjusted under 35 U.S.C. 154(b) by 61 days.

(21) Appl. No.: 17/258,840

(22) PCT Filed: Jul. 9, 2019

(86) PCT No.: PCT/IB2019/055846
§ 371 (c)(1),
(2) Date: Nov. 29, 2021

(87) PCT Pub. No.: WO2020/012360
PCT Pub. Date: Jan. 16, 2020

(65) Prior Publication Data
US 2022/0078967 A1    Mar. 17, 2022

(30) Foreign Application Priority Data
Jul. 10, 2018   (AR) .......................... P2018 01 01923

(51) Int. Cl.
*A01C 7/08*     (2006.01)
*A01C 15/06*    (2006.01)
(Continued)

(52) U.S. Cl.
CPC ............ *A01C 15/06* (2013.01); *A01C 15/006* (2013.01); *A01C 15/04* (2013.01); *B65G 53/12* (2013.01); *B65G 53/40* (2013.01); *B65G 53/66* (2013.01)

(58) Field of Classification Search
CPC .................................................... A01C 7/082
See application file for complete search history.

(56) References Cited

U.S. PATENT DOCUMENTS

| 4,296,695 A | * | 10/1981 | Quanbeck | A01C 15/04 111/178 |
| 4,685,843 A | * | 8/1987 | Keim | B65G 53/52 406/191 |

(Continued)

FOREIGN PATENT DOCUMENTS

| DE | 102011055124 A1 | * | 5/2013 | ............. A01C 7/081 |
| RU | 2596014 C1 | * | 8/2016 | ............. A01C 15/00 |

OTHER PUBLICATIONS

International Search Report Form PCT/ISA/210, and Written Opinion Form PCT/ISA/237, International Application No. PCT/IB2019/055846 pp. 1-7International Filing Date Jul. 9, 2019 mailing date of search report dated Dec. 4, 2019.

*Primary Examiner* — Joseph A Dillon, Jr.
(74) *Attorney, Agent, or Firm* — Lucas & Mercanti, LLP (57) ABSTRACT

Device for delivering solid particles on demand, intended for agricultural machine, wherein the delivery on demand of solid particles to a receiving device is regulated, particularly in the field of technology for transporting solid granulated materials by means of an air stream, without being exclusive, in agricultural machinery when an air stream is used to transport seeds or fertilizer granules from at least one central hopper to the dosing/metering equipment located on the sowing unit, and including a source of pressurized air, a distributor of solid particles "S", a hopper whose bottom feeds solid particles "S" to the distributor and a plate permeable to the passage of air and on which said particles "S" settle.

5 Claims, 5 Drawing Sheets (51) Int. Cl.
*A01C 15/00* (2006.01)
*A01C 15/04* (2006.01)
*B65G 53/12* (2006.01)
*B65G 53/40* (2006.01)
*B65G 53/66* (2006.01)

(56) References Cited

U.S. PATENT DOCUMENTS

| | | | |
|---|---|---|---|
| 5,878,679 A * | 3/1999 | Gregor | A01C 15/04 |
| | | | 111/178 |
| 5,979,343 A * | 11/1999 | Gregor | A01C 7/081 |
| | | | 111/178 |
| 6,845,724 B2 * | 1/2005 | Mayerle | A01C 7/20 |
| | | | 221/211 |
| 7,021,224 B2 * | 4/2006 | Mayerle | A01C 7/20 |
| | | | 221/211 |
| 7,182,029 B2 * | 2/2007 | Johnson | A01C 7/081 |
| | | | 111/175 |
| 7,213,525 B2 * | 5/2007 | Meyer | A01C 7/081 |
| | | | 221/203 |
| 10,219,428 B2 * | 3/2019 | Bedosti | A01C 7/081 |
| 2004/0163578 A1 | 8/2004 | McDonald et al. | |
| 2013/0276684 A1 | 10/2013 | Whilhelm et al. | |
| 2014/0261116 A1 * | 9/2014 | Redman | A01C 7/081 |
| | | | 406/155 |
| 2022/0192078 A1 * | 6/2022 | Johansson | A01C 15/04 |
| 2022/0240440 A1 * | 8/2022 | Garcia Rojas | A01C 7/123 |
| 2022/0264788 A1 * | 8/2022 | Jagow | A01C 7/06 |
| 2022/0312665 A1 * | 10/2022 | Crucianelli | A01C 7/123 |

\* cited by examiner

DEVICE FOR DELIVERING SOLID PARTICLES ON DEMAND, INTENDED FOR AGRICULTURAL MACHINERY

FIELD OF APPLICATION OF THE PRESENT INVENTION

The present invention of this application is related to the devices that regulate the delivery on demand of solid particles to a receiving device thereof.

More particularly, the present invention protects the delivery on demand of seeds, or granules of fertilizers or other input used in agriculture, to an agricultural machine, such as a seeder, and is applied to the field of technology for the transport of solid granulated materials by means of a stream of air, as occurs, without these being exclusive, in agricultural machinery when an air stream is used to transport seeds or fertilizer granules from at least one central hopper to the dosing equipment located on the unit of sowing.

NOMENCLATURE OF TERMS USED IN THE PRESENT INVENTION

During this document, pertaining to this invention patent, it should be understood that the following terms have the following meaning:

By the term "delivery" it is understood the capacity of these devices to supply the solid particles from a hopper or main container to their final destination of use in any part of their route/path.

"Solid particles" means an input in discrete portions such as seeds, or granules of any other type of input, such as fertilizers etc. For the purposes of the present specification, the word "seed" will be used with the same meaning as "solid particles".

The term "on demand" is applied in air stream seed supply systems. These systems obtain this denomination because the mass of solid particles (e.g. seeds) transported by said air stream from the main tank or hopper to the dispensers is displaced as a function of the level of solid particles existing in each dispenser. When an air stream is established in the delivery circuit, solid particles are dragged from said main tank to the secondary tanks or hoppers of each dispenser, and when the secondary hopper is filled with the agglomeration of solid particles (e.g. seeds) an obstruction occurs in the air transport duct with the result that a decrease in air velocity is achieved. Taking into account that the movement capacity of the solid particles is proportional to the speed of the entrained air flow, the obstructions limit or stop the delivery of said particles. As the dispenser delivers its reserve of, for example, seeds, their level decreases, the duct obstruction is released and the transport of particles through the air stream is re-established until the loading level of the secondary hoppers is completed again. A dynamic balance is established between the main hopper and the secondary ones governed by the delivery speed of each dispenser, and this dynamic balance of transport is called "on demand", demand that is imposed by the dispenser (generally "single grain/mono-grain").

BACKGROUND OF THE PRESENT INVENTION AND STATE OF THE PRIOR ART

Seeders and other agricultural machinery designed for large scale work typically include at least one main, relatively large volume hopper and a plurality of secondary and individual hoppers associated with the dosing units. For example, during the sowing operation, each secondary hopper contains the seeds that the seeder distributes in the soil through the dosage units, responsible for delivering the seed to the soil. As the seeder moves over the planting area, it is important that the dosing units distribute the seed evenly and at precise intervals to achieve proper crop spacing. To achieve such a distribution, it is important that the seed supply to the dosing units is constant and uninterrupted.

Modern seeders have individual metering devices associated with each of the aforementioned secondary hoppers located across the implement, and require individual filling of each secondary hopper. Each secondary hopper is linked by means of hoses to the distributor device, which acts as a distribution manifold for the air streams with seed dragging. There are various types of devices creating an air stream for the supply from a central hopper of the solid particles to the individual row dispensers.

These devices that create an air stream generally consist of a pressurized hopper with a supply device at its lower end for the controlled feeding of granular material from the hopper subjected to the action of an air stream generated by a fan, compressor or suitable medium to the effect capable of sending the air stream from a main conduit/duct that extends from said fan to a primary distribution manifold or supply means arranged immediately below and in communication with the main hopper. The bypass lines run from said supplying means to the secondary hoppers and then to the associated dispensers, which in turn feed the seeds with the furrow opener means and other accessories already known in the art. Pneumatic pressure from the fan creates a stream of air that carries the granular material through a network of flexible hoses.

Figure 1:
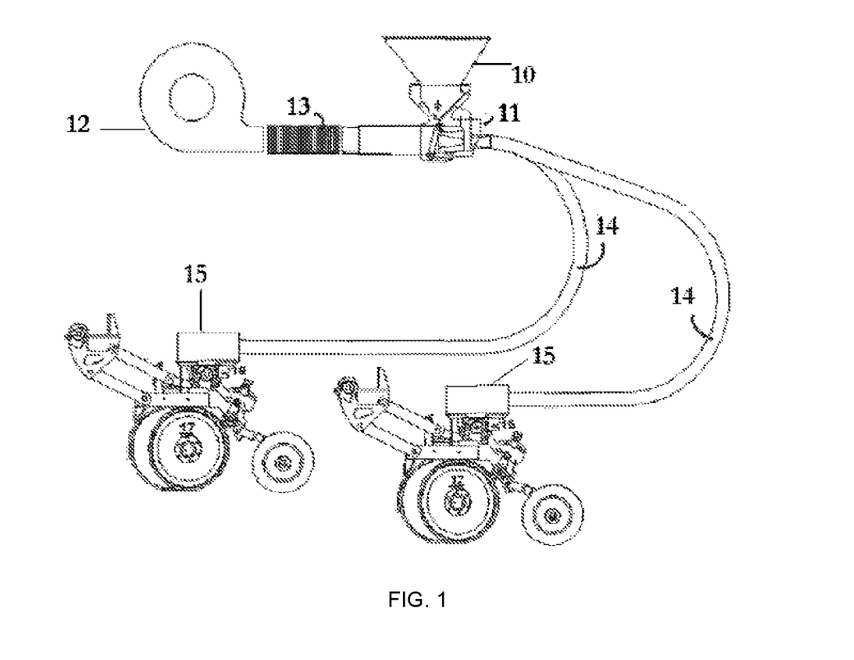
FIG. 1 shows, as already indicated, a known and typical prior art arrangement in which the arrangement of a blower, the main hopper, the location of the distributor device and the conduction hoses for the particles to the secondary hopper and dosing means are schematically shown.

For merely illustrative purposes, FIG. 1 represents a scheme of traditional agricultural machinery that uses the sum of the resources mentioned above. In said figure, the existence of a main hopper (10) that is in charge of supplying seed (or other solid particles) by gravity to the supplying or distributor device (11) is observed schematically and in a generic way. The latter is connected to an air source (fan 12) that provides an air stream that generates the necessary thrust for the transfer of the seed, and this air stream is conducted through the conduit (13) and enters it to (11). This supplying device distributes the seed that falls by gravity from (10) to (11) and from there it is transported by means of a plurality of individual outlets to an equal number of hoses (14) connected to each of said outlets, which lead the solid particles carried by the air stream to a secondary hopper (15) thereof, that is, a hopper for each conduit or hose (14). Each secondary hopper (15) stores a quantity of granulate and is in charge of supplying the granulated material by gravity to a single-grain dispenser (16), and once said granular material is dosed, it is deposited on the ground by means of implements (17) and techniques known in the art.

This arrangement of resources can be discussed, for example, in U.S. Pat. Nos. 4,685,843 A; 6,845,724 B2; 7,182,029 B2; 7,213,525 B2, among others and cited here for reference purposes only.

The use of "single-grain" dispensers, that is, which individualize and deliver seed by seed for maximum precision in distribution is mainly due to the increase in the operating capacity of large agricultural machinery. The single-grain dispensers are, as seen, mounted on a respective seeder unit.

As already mentioned, in the supply systems "on demand" known in the art, the mass of seed or solid particles is transported by dragging by an air stream from the distribution device to the secondary hoppers, but once these tanks secondary are filled, an obstruction occurs in the transport hose (14) with the consequent decrease in the speed of the air flow, and since the transport capacity of the seed (or granules) is proportional to the speed of the air flow, decreases and even stops said transport of seed. As the dosing units continue to work, removing the seeds from the secondary hoppers one at a time, the seed level decreases in said hoppers, with which the obstruction disappears, and "on-demand" of the secondary hopper is re-established again, sending seeds or granules.

These distribution devices consist of elongated boxes or casings, arranged transversely, and connected to the fan, and on its opposite each, to a plurality of outlets. To this end, in the prior art, said known distributors can be seen in their various constructions, in the various patent publications US 2007079592 A1; U.S. Pat. Nos. 5,161,473A; 5,979,343 A; 7,182,029 B2; 7,213,525 B2, among others and cited here for reference purposes only.

Problems Found in the Devices of the Prior Art

In the state of the art, (see FIG. 1) one of the preferred constructive forms is that the air generated by the fan (12) in the distribution device (11) is divided using a first part of said air stream to activate the seed contained in the hopper bottom portion (10) that feeds the seeds to the distributor (11), making the derived air stream pass through a screened floor or porous floor, "lifting" the seeds, while the flow of the second part of the air flow it is directed towards the distribution conduits that connect with the hoses (14) that lead towards the secondary hoppers (15).

Although this arrangement for dragging and feeding seeds or granulated products is used in the stream state of the art, it presents a series of limitations.

One of the drawbacks found in the known constructions is given by the variety of size and specific weight between the various types of seeds, and between the various granulated products (for example, fertilizers, insecticides, etc.) which creates in these known devices serious regulation difficulties, both for the "activation" air stream and for the transport air stream, since these parameter variations require different intensities of the first and second flow. In effect, the known devices have as a variable the general control of the speed of the delivered air stream, but it is not possible to independently regulate the speed of the first part of said air stream, which is the "activation" one, from the second stream of air that is the one of "dragging" of the seeds. In the known devices, if the first air stream needs to be decreased, the second entrainment stream is unfailingly decreased as well, which implies the consequent transport capacity of the particles or seeds. This is a drawback that occurs with seeds of various characteristics and leads to poor operation of the agricultural equipment that uses these systems.

A second drawback occurs when, under the "on demand" regime, the accumulation of seeds in sectors of the supply conduit (14) produces the aforementioned obstruction thereof. In these cases, in known devices, the air flow in the single-grain dispenser decreases. This progressive decrease in the dragging capacity generates, in certain stages of the supply cycle, that the seed "activated" by the passage of the first flow rate through the porous floor of the supplying device is dragged by the increase in the speed of the first flow (by decreasing the flow of the second flow or drag) towards the corresponding conduit or hose (14), with the drawback that this first stream does not have the necessary drag capacity which creates a series of secondary plugs in different sections of the conduit, which creates the blockage of it.

Several attempts are known to solve these problems raised above, and in particular we can cite the following documents:

U.S. Pat. No. 5,379,706 covers a seed distribution device. Hereafter, the indicated references belong to this patent U.S. Pat. No. 5,379,706. In this document, the seed distribution unit includes a cylindrical adjustable support (46) in telescopic relationship with the chamber wall (28) linked in communication with the bottom of the main hopper (16), with a bottom wall (50) and a seed support plate (52) located in spaced relationship to the bottom (50). The support plate (52), the bottom wall (50) and the outer wall (48) define a chamber (54) whose dome is the plate (52) with holes. An air supply supplies air to an inlet (58) whereby air is supplied to impeller chamber (54) to tubular member (30) through an opening (60) in support plate (52) substantially concentric with the longitudinal axis (32). Furthermore, a screen (62) extends over the opening (60) through which the seed is prevented from entering the chamber (54). Although this patent mentions the existence of a porous or screened/sieved plate on which the seeds sit and are subjected to an air stream passing through the plate, there is no mention of a separation of the primary air stream (from the fan) into two separate streams: one that "relieves" the seeds on the plate and the other stream that drags the seeds, the function of the first air stream being independent of the second.

In published application US2017/00318737 A1, an extension of the previous US 2017/0318737 A1, a metering device is protected to control the dispensed quantity of seed.

The numerical references cited here belong to the specification of US2017/00318737 A1. Using an adjustable part to regulate a flow rate, a simple way is provided to control the introduction and transport of granular material in an air flow. Therefore, the flow rate for material such as rapeseed and sorghum can be reduced and increased for material that is more difficult to absorb, such as corn and soybeans. The feeding device in FIGS. 4*a*-4*d* comprise an intake area (102), which has a base (1021), a roof (1022) and a pair of side walls (1023). The collection zone extends in a longitudinal direction, substantially straight between the air inlet zone (102*a*) and the outlet air (102*b*), and thus parallel with the air flow. The collection zone has a material inlet (102*c*), which is open in a horizontal direction. The material inlet may extend between the base and the lower portion (1023') of the side wall (1023). The roof (1022) extends the entire length of the collection area and is adjustable in height. When the ceiling is in its upper position (FIG. 4*c*), the flow rate will assume its lowest value, given a determined flow and pressure from an air source. When the roof is in the lower position (FIG. 4*d*), the flow rate will be higher than in FIG. 4*c*, which gives the ability to drag larger or heavier granules and the roof (1022) can be continuously adjustable.

Also in this case a division of which of air in the two above-mentioned streams is not shown.

U.S. Pat. No. 8,800,458 (the references cited here are proper to said patent) covers a hopper (10), which feeds a longitudinal tray, below which there are a plurality of openings into which the seeds are pushed by a stream of air and sent to individual dosing devices. The air distributor (12) includes a single air inlet that enters its interior (500) and from there to a grid (124) where it lifts and drags the seed towards the outlet (22). The grids (14) are fixed.

Although this patent also makes use of a screened floor through which the air passes, the air stream is not divided and we have a single air stream that "relieves" the seeds and transports them.

U.S. Pat. No. 5,979,343 (the references cited here are proper to said patent) teaches the construction of a chamber for a seed distributor arranged between the blower (60) and the distributor, which includes a damping plate (95) having a series of openings (100) in a fixed plate coincident with the primary tubes. The damping plate (95) can move vertically with respect to the fixed plate, varying the flow rate of air that enters in a substantially uniform way for the same row of outlet ports (100). According to FIG. 3, there is a counter plate with triangular openings (137) and facing (100), to accelerate the restrictions to the passage of air, which is varied by the presence of the damping plate (95) when moving with another (137). In this patent we observe a register/regulator (part of a machine used to regulate the flow) for the acceleration of the air, which does not contemplate a division of the primary flow into two independent streams, and the aforementioned acceleration of the flow is a function of the position of the relative plates, and does not constitute a proper Venturi.

Analyzing U.S. Pat. No. 8,800,458, in which the references belong to the cited document, we see that therein the pressurized air is introduced into a manifold (500) of (12A). Each base (121A) includes an air-permeable perforated surface (124). The seed falls on the perforated surface (124). Air flows through perforated surface (124) in the direction of arrow (132) (FIG. 7), causing agitation of the seeds. This agitation causes mixing and lifting of the seeds in the air flow that passes through the air entrainment device 12A for discharge through the outlet port (22). The air dragging device (12) includes an air channel (130). Air is introduced into the air bypass channel (130). There is a partition (138) within the dragging device that separates the flowing air into two streams. A first stream passes up through the perforated surface (124) and drives the seed up into a mixing chamber (505) and a second stream passes through the opening (134) and recombines with the first air at the outlet port (22). The second stream of seedless air will have a force and/or speed greater than that of the first stream. Consequently, when stream recombination occurs, the second stream assists the first stream in discharging seeds through the outlet port (22). This airflow feature is especially useful for thinning seeds, preventing blockages, and reducing seed flow in the event of a blockage. However, despite the fact that in this construction a division of the air flow coming from the fan is obtained, there is no means for the individual acceleration of the air flow in the outlet conduits to the hoses, nor is there a regulator of the air flow passing through the sieved plates or porous plates, which results in fixed ratios between the two flows thus divided, without the possibility of regulating one of them.

Objects of the Present Invention

The object of the present invention is a device for the transport and distribution of solid particles on demand, a device that receives the aforementioned solid particles from a main hopper and deposits them on a porous floor to the passage of air and belonging to a distribution device, on the which a first air stream impinges from below upwards, the seeds being dragged by a second air stream independent of the flow rate of the first. It is also an object of the present invention to have a source of pressurized air, capable of creating an air stream, which enters a distributor of solid particles, such as seeds or granules, said air stream being divided into two streams; one of them passes through the porous floor, activating the seeds predisposing them towards a distribution collector channel, and the second stream is accelerated, intercepting the distribution channel at its point of maximum acceleration, downstream of which said second air stream is in turn subdivided into a plurality of streams individually accelerated by Venturi effect and entering as many conduits or hoses that drag the solid particles and lead them to the secondary hoppers and from there to the dosing devices.

It is also an object of the invention that said first stream, passing through the floor permeable to the passage of air, has a selectively variable regulator of the volume of air that impinges on it, which makes it possible to regulate the flow of the second air stream.

Brief Overview of the Invention

DEVICE FOR THE DELIVERY OF SOLID PARTICLES ON DEMAND, APPLIED TO AN AGRICULTURAL MACHINE, of the type of agricultural machine that comprises a source of pressurized air, capable of creating an air stream, which enters a distributor of solid particles; said distributor being composed of an envelope defined by side walls, a bottom and a dome, with a front end through which the air stream from the air source penetrates and a rear end wall from which at least one of the air outlet for the transport of solid particles, said agricultural machine comprising at least one main hopper from the bottom of which feeds a mass of said solid particles to the referred distribution medium, which has a plate permeable to the passage of air and on which settle said solid particles and subjected to at least part of said air stream from the distributor, particles that are sent by said air stream downstream of said distributor to at least one hose linked to said at least an air outlet from the distributor itself, and is characterized in that the interior of said distributor, adjacent to the end opposite the air inlet has an upper channel and a lower channel, both open towards the upstream end of the distributor, one being vertically superimposed on the other and separated from each other; the upper channel is defined between two substantially horizontal walls spaced apart, which ends downstream in a substantially vertical wall that rises from the bottom of the distributor, rests against the downstream edge of the plate permeable to the passage of air and extends above from the same to an intermediate height between said permeable plate and the walls of the hopper, defining a crest or free edge; at least part of the upper wall of the distributor that conforms to said upper channel is determined by the plate permeable to the passage of air in communication with the bottom of the hopper and on which the solid particles from the main hopper settle; said crest or free edge extends into a chamber formed by a second wall, spaced from the first and which closes superiorly on the bottom of the main hopper, determining a passage between said second wall and said crest; the second wall is extended downwards, substantially parallel and separated from the first vertical wall until it reaches the bottom of the distributor and forming a vertical chamber, the outlet of the at least the first duct of the second passage communicating with said vertical chamber; the outlet mouth of the at least one first duct of the second passage faces a second duct axially aligned with the first, the inlet mouth of which coincides with the second vertical wall, the opposite end of said second duct being linked to at least one linked hose to metering means for solid particles; the air flow that enters the distributor is divided into two air streams, one upper and the other lower, the upper air stream entering said upper channel, while the lower air stream enters at least said first duct that defines the lower channel that opens into the vertical chamber through said first vertical wall; the first channel presenting means for regulating the flow rate of the first stream, the same being through a sieved plate; the first stream determining an upward impulse solicitation (effect produced in a body when subjected to a system of forces) on the solid particles settled on the permeable plate above the crest edge of the first vertical wall, determining the fall of said particles in the vertical chamber where they face the second stream coming from the first duct of the second passage.

DETAILED DESCRIPTION OF THE ATTACHED DRAWINGS

In order to exemplify a preferred embodiment of the present invention, the following illustrative drawings are attached, supported by the description thereof given below, this embodiment should be interpreted as one of the many possible constructions of the invention, so it is not appropriate to assign any limiting value to it, including within the scope of protection of the invention the possible means equivalent to those illustrated; the scope of the present invention being determined by the first claim appended in the corresponding claims chapter.

In these Figures, the same references identify the same and/or equivalent means.

FIG. 1 has already been described in the previous paragraphs. The object of this figure is to provide one of the many possible uses of the distributor (11) installed in an agricultural machine, a distributor that is the reason for the present invention.

Figure 2:
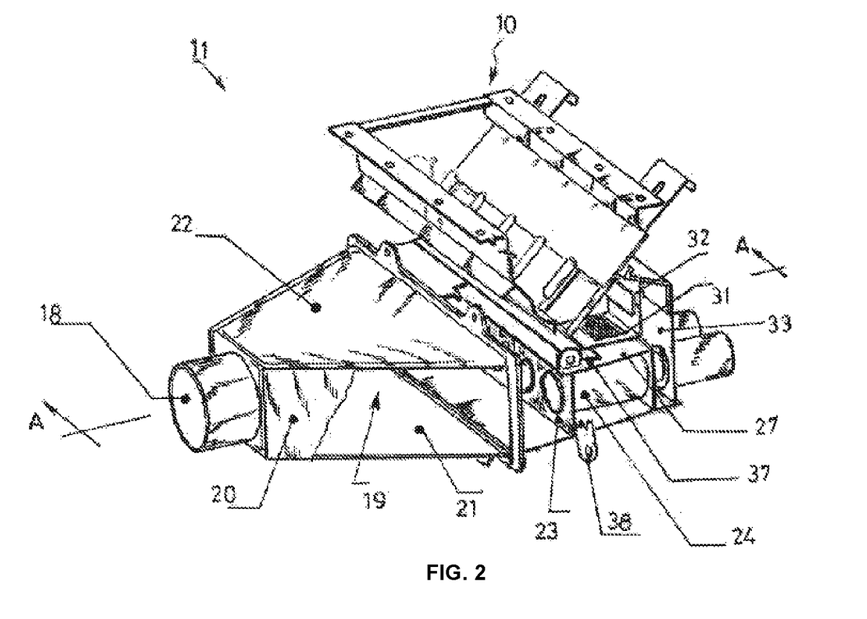
FIG. 2 shows in a partially sectioned perspective, a construction of the dispenser object of the present invention.
Figure 3:
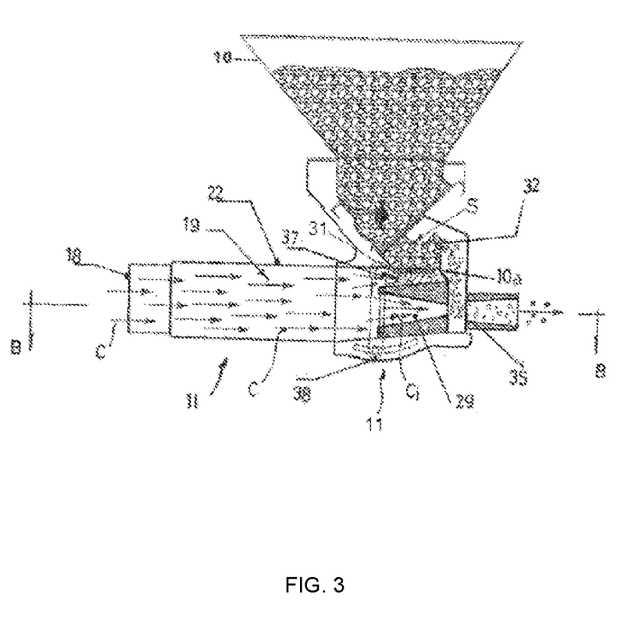
FIG. 3 is section AA of FIG. 2.
Figure 4:
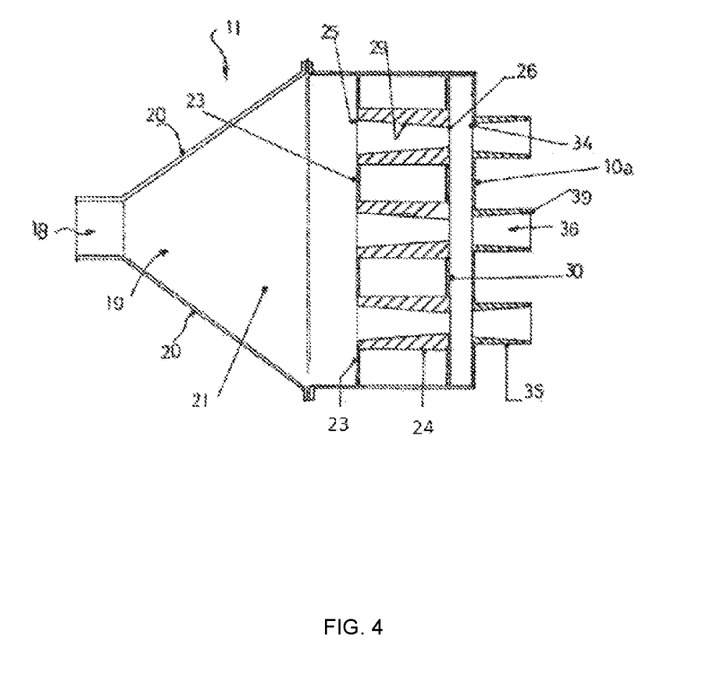
FIG. 4 illustrates section BB of FIG. 3.

FIG. 2 shows in a partially sectioned perspective one of the possible constructions of the distributor (11) of the present invention, in which the entry of the air stream coming from (12,13) is indicated with (18), and as taught by the known prior art, it enters the dosed interior (19) of the distributor, which is ideally divergent, without this being exclusive, expanding until it adopts a rectangular cross-sectional configuration (see FIGS. 2 and 4). This interior (19) has side walls (20), a floor (21) and a roof or dome (22), these being preferably flat so as not to introduce factors of increased turbulence in the air flow that penetrates (19) from (18). Inside the inlet (18) the interior of the distributor is partially closed by a vertical partition (23), from which at least one conduit (24) arises, ideally a plurality of first conduits (24), parallel and substantially horizontal, whose respective inlet ports (25) communicate with the interior (19) in said partition (23) (see FIGS. 4 and 5).

These first conduits (24) are arranged one parallel to the other and each have an outlet (26). Superior to these conduits there is a substantially oblique-horizontal surface (27), arranged separately and below the plate that defines the continuation of the dome or roof (22), determining between them a first substantially horizontal channel (28), open towards the interior (19) into which a first stream of air (Cs) enters (FIGS. 2 and 5), the first channel that is separated and isolated from the second channels (29) created by the summation of the first conduits (24) through which the second air stream ($C_i$) enters. Indeed, the air stream (C) entering (11) through (18) according to the present invention is subdivided within the distributor into two streams: a first upper air stream (Cs) and a second lower air stream ($C_i$).

Figure 5:
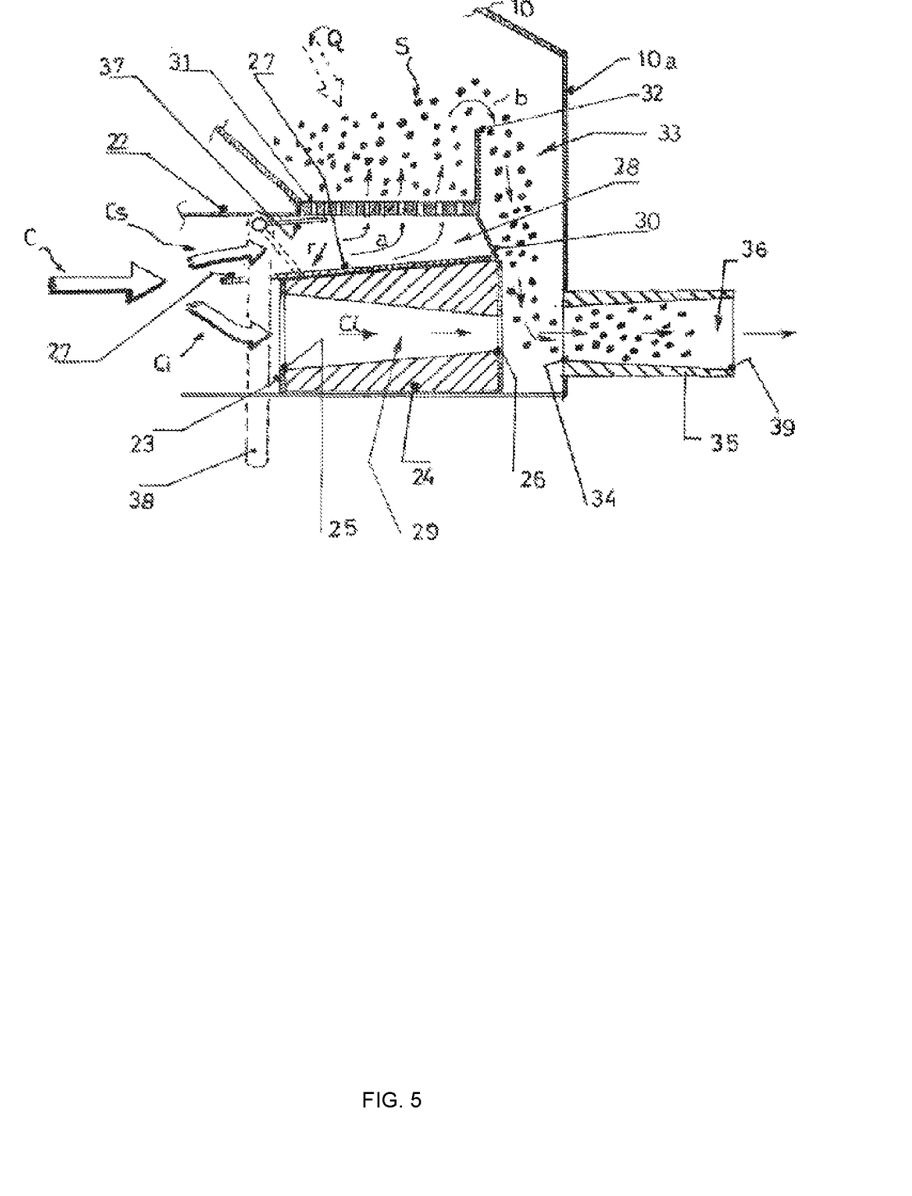
FIG. 5 shows an enlarged detail of a construction of the present invention.

This first channel (28) ends downstream in a substantially vertical wall (30) that connects superiorly with a sieved plate (31) or porous surface to the passage of air. This sieved plate (31) substantially horizontal and in communication with the first channel of the distributor constitutes the floor for the reception by gravity of the granular particles (seeds) (S) that come from the main hopper (10), and downstream with respect to of the direction of advance of the air streams, as will be explained later, there is the continuation of the substantially vertical partition that has a crest (32) that, projecting above the air-permeable plate (31), defines a vertical space or chamber (33) between said crest plate (32) and to the opposite wall (10a), continuation of the hopper (10), being (10a) substantially vertical and perpendicular to the bottom surface (19) of the distributor (11).

In said wall (10a) and axially aligned with each of the axes of the respective second channels (29) created by the summation of the respective first conduits (24), there are as many openings (34) belonging to second conduits (35) continuators of conduits (24), so that the conduits (36) defined there are separated and axially aligned with (29).

The first substantially horizontal channel (28) exhibits a flow rate regulator.

Said flow rate regulator can be generic, since what is desired is to place a device that allows the flow of flow rate (Cs) passing through the first channel (28) to be regulated at will. By way of illustrative and non-limiting example, this regulator has been represented by a pivoting plate (37) and actuated by a lever (38). It is also used a throttle type regulator (version not illustrated). As can be seen in FIG. 5, the position, according to the angular displacement "r" of the plate (37), determines the variation of the flow rate of (Cs).

It is observed in FIG. 5 that in a preferred construction of the invention, but not exclusive, each channel (29) presents a gradient of decrease in its diameter, progressively decreasing from its inlet (23) to its outlet (26) where it flows into the vertical chamber (33) and there it faces axially aligned to the corresponding second conduits (36), which have a diameter with a progressively increasing gradient from their inlet (34) to their outlet (39), configuring for each pair of conduits (24,35) respective venturi.

Operation of the Present Invention

With the aid of the aforementioned figures, the air driven by a fan (12) enters through (18) into the interior (19) of the distributor (11). There it faces the inlets of the upper channel (28) and the lower channel (29) and is subdivided into two streams, the upper (Cs) and the lower ($C_i$).

In the preferred construction of the invention, the upper air flow (Cs) penetrates through (18), and passes through the plate (31) permeable to the passage of air, which can be constituted by a sieved or perforated plate that conforms the extension of the dome of the distributor (11).

The solid particles (seeds) "S" fall by gravity according to the arrow "Q" on said plate (31) and there they receive the upward solicitation "a" from the air stream (Ci) which makes the seeds "S" exceed the upper edge or crest (32) of the first vertical wall (30) and after surpassing (32) fall at "b" inside the vertical chamber (33).

Upon reaching the bottom of said vertical chamber (33), the seeds receive the solicitation of the lower air stream (Ci), accelerated air stream inside the venturi, and said air stream expelled by the outlet (26) of the first section (24) of the second channel is introduced into the inlet of the second section (35).

The flow regulator (37) allows the flow rate of (Cs) and (Ci) to be varied, with which the same distributor (11) can be used for a wide range of solid particles "S" depending on their granulometry, relative humidity and specific gravity.

The invention claimed is:

1. A device for delivering solid particles on demand of the type of agricultural machine comprising:
   a source of pressurized air creating an air stream, which enters a distributor of solid particles, said distributor being comprised by an envelope defined by side walls, a bottom and a dome, with a front end through which the air stream from the source of pressurized penetrates and a rear end wall from which at least one of an air outlet for the transport of the solid particles is formed;
   at least one main hopper comprising a bottom, wherein the bottom feeds a mass of said solid particles to said distributor of solid particles, which has a plate permeable to the passage of air and on which said solid particles settle and are subjected to at least part of said air stream from the distributor, particles that are sent by said air stream downstream of said distributor to at least one hose linked to said at least an air outlet from the distributor itself,
   an interior of said distributor, adjacent to the end opposite that of the air inlet, has an upper channel and a lower channel, both open towards an upstream end of the distributor, one being vertically superimposed on the other and separated from each other wherein the upper channel is defined between two substantially horizontal walls spaced apart, which ends downstream in a substantially vertical wall that rises from the bottom of the distributor, rests against the downstream edge of the plate permeable to the passage of air and extends above from the same to an intermediate height between said permeable plate and the walls of the hopper, defining a crest or free edge;
   at least part of an upper wall of the distributor that conforms to said upper channel is determined by the plate permeable to the passage of air in communication with the bottom of the hopper and on which the solid particles from the main hopper settle;
   a crest or free edge extends into a chamber formed by a second wall, spaced from a first vertical wall and which closes superiorly on the bottom of the main hopper, determining a passage between said second wall and said crest;
   a second wall is extended downwards, substantially parallel and separated from the first vertical wall until it reaches the bottom of the distributor and forming a vertical chamber, an outlet mouth of at least one of first conduit of a second passage communicating with said vertical chamber;
   the outlet mouth of the at least one first conduit of the second passage facing a second conduit axially aligned with the first conduit, an inlet mouth of which coincides with the second vertical wall, an opposite end of said second conduit being linked to at least one linked hose to metering means for solid particles;
   an air flow rate that enters the distributor is divided into two air streams, one upper and the other lower, the upper air stream entering said upper channel, while the lower air stream enters at least said first conduit that defines the lower channel leading to the vertical chamber through said first vertical wall;
   a first channel presenting means for regulating the flow rate of the first stream through a screened plate, the first stream determining an upward impulse solicitation on the solid particles settled on the permeable plate above the crest or free edge of the first vertical wall, determining a fall of said particles in the vertical chamber where the particles face the second stream coming from the first conduit of the second passage.

2. The device according to claim 1, wherein the lower wall of the first channel is a divergent oblique wall upstream of the first air stream, and the plate permeable to the passage of air is substantially horizontal and is a continuation of the dome of the distributor.

3. The device according to claim 1, wherein the plate permeable to the passage of air is a sieved or perforated plate.

4. The device according to claim 1, wherein the second passage is formed by a plurality of conduits, parallel to each other with a decreasing circular section, each one forming a venturi.

5. The device according to claim 1, wherein the first channel presents a regulator of the air flow rate that enters it, selectively variable, chosen between a pivoting plate and a throttle plate.

* * * * *